United States Patent [19]

Kolesar et al.

[11] 4,381,428
[45] Apr. 26, 1983

[54] ADAPTIVE QUANTIZER FOR ACOUSTIC BINARY INFORMATION TRANSMISSION

[75] Inventors: Robert R. Kolesar; John T. Rickard; James R. Zeidler, all of San Diego, Calif.

[73] Assignee: The United States of America as represented by the Secretary of the Navy, Washington, D.C.

[21] Appl. No.: 262,362

[22] Filed: May 11, 1981

[51] Int. Cl.$^3$ .................................................. G10L 1/00
[52] U.S. Cl. .............................. 179/15.55 R; 367/134
[58] Field of Search ................. 179/15.55 R, 15.55 T, 179/1 SA, 1 D, 1 P; 364/724; 370/118; 358/260, 261; 367/134

[56] References Cited

U.S. PATENT DOCUMENTS

| 4,066,842 | 1/1978 | Allen | 179/1 SA |
| 4,133,976 | 1/1979 | Atal et al. | 179/1 SA |
| 4,142,071 | 2/1979 | Croisier et al. | 179/1 SA |

OTHER PUBLICATIONS

Widrow, "Adaptive Noise Cancelling", Proc. IEEE, Dec. 1975, pp. 1692–1716.

*Primary Examiner*—Emanuel S. Kemeny
*Attorney, Agent, or Firm*—Robert F. Beers; Ervin F. Johnston; Thomas Glenn Keough

[57] ABSTRACT

An apparatus and technique reduces the data transmission rate required to transmit acoustic signals from undersea sensors to remote monitoring locations without degrading the surveillance information content of the signals. The signals are digitized and fed to an adaptive line enhancer (Wiener filter) which processes them so that a fast Fourier transform (Karhunen-Loeve approximation) coefficient generator can feed representative signals to a programmable quantizer and a signal averager. When significant shifts are detected in the fast Fourier transform coefficient variances, responsive signals are generated by the programmable quantizer for adaptive bit allocation. An interconnected multiplexer transmits multiplexed signals to the remote monitoring station where the inverse of the foregoing allows an analysis of the acoustic signals being monitored.

3 Claims, 5 Drawing Figures 4,381,428

ADAPTIVE QUANTIZER FOR ACOUSTIC BINARY INFORMATION TRANSMISSION

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The vast amounts of data coming, for example, from a number of sensors create data transmission and processing problems that are largely caused by the sheer bulk of the incoming information. As a consequence, a number of techniques have evolved for reducing or otherwise compressing the incoming data without compromising the information content. The design of a data compressor for nearly any type of data must address three important considerations. First, the degree that the data is statistically redundant must be determined; second, the true information content of the data by a particular user must be established and; third, the tolerable degree of distortion of the data for a particular user must be defined. Usually, satisfying the first consideration takes care of the third to fix the amount of compression with tolerable distortion. If this amount of compression is not sufficient, then other schemes must be considered that might distort the original data. In this case the second and third considerations determine the type and extent of data compression chosen at the expense of some distortion.

Contemporary data compressors have generally been designed for cases where the data is highly redundant and all of the original signal is assumed to be of interest to the user. Acoustic surveillance data, however, is not highly redundant within the frequency bandwidth of interest; thus, the prospects for distortionless compression are rather meager. Furthermore, only a small fraction of the total signal power is usually of interest to a user, that is, that portion which represents the narrowband "line" components in the signal. The broadband power which constitutes most of the signal is useless insofar as signal processing is concerned. Hence, a noisy-source encoding approach is required for an effective solution to the acoustic data compression problem.

The problem of optimum source encoding for a signal corrupted by noise has been addressed in the literature for the case of a frequency-weighted mean-squared error (WMSE) distortion measure. A thorough analysis of this problem is defined by R. L. Dobrushin and B. S. Tsybakov in their article entitled "Information transmission with additional noise," *IRE Trans. Inform. Theory*, vol. IT-8, pp. 293–304, September 1962; J. K. Wolf and J. Ziv in their article entitled "Transmission of noisy information to a noisy receiver with minimum distortion," *IEEE Trans. Inform. Theory*, Vol. IT-16, pp. 406–411, July 1970; and T. Berger, *Rate Distortion Theory*, Englewood Cliffs, N.J.: Prentice-Hall, 1971.

By way of example, the problem can be better visualized by noting FIG. 1 and its typical optimum communication system 10. Although the WMSE distortion measure tends to be a rather poor choice for acoustic signals, the system shown will serve as a starting point. A source 11 of signals s includes an analog family of narrowband components which are received in a background of additive broadband noise n represented by source 12. An optimum encoder 13 first computes the minimum mean-squared error estimate of s given x in a conditional mean computer 14. This estimate, u, is simply the conditional mean $E_x(s)$ of s given x, and is implemented in the case of Gaussian signal and noise by an infinite-lag Wiener filter, see A. Papoulis, *Probability Random Variables, and Stochiastic Processes*, New York: McGraw-Hill, 1965.

The final step is to encode u in encoder 15 for minimum-rate transmission over the communications link with respect to the WMSE distortion measure. Again in the Gaussian case, this can be achieved by performing a Karhunen-Loéve transform on the quantized coefficients $a_k$. Transmission over a data link 16 to a decoder section 17 delivers decoded data from a decoder 18 to the user in the form $s = E_y u$.

In practice, the optimum communication system referred to above only can be approximated due to the constraints of finite processing times and unknown non-stationary signal statistics. If we assume Gaussian signals and noise, the computation of u can be implemented by an adaptive, finite-length Wiener filter. Furthermore, the Karhunen-Loéve transformation in the encoder (an exceedingly difficult computation) may be replaced by the more facile Fourier transform. These two transforms are asymptotically equivalent as the integration time approaches infinity. For a further analysis of this technique please see J. Pearl, "On coding and filtering stationary signals by discrete Fourier transforms," *IEEE Trans, Inform. Theory*, vol. IT-19, pp. 229,232, March 1973. Finally, the weighted-variance quantization may be accomplished by estimating the coefficient variance and using a predetermined weighting rule. This along with the other considerations enumerated above are balanced against one another to arrive at an acceptable compromise. The state-of-the-art has failed to provide an acceptable compromise particularly adaptable to the highly noisy information coming from a number of acoustic monitors receiving narrowband "line" information amongst ever present Gaussian white noise.

SUMMARY OF THE INVENTION

The present invention is directed to providing an apparatus for reducing the data transmission rate for acoustic signals. A source of analog signals representative of impinging acoustic energy is coupled to a digitizer which provides representative digital signals. These digital signals are coupled to an adaptive line enhancer which processes the digital signals and feeds them to at least one fast Fourier transform coefficient computer. The fast Fourier transform coefficients are averaged and a signal is provided when there has been a significant shift in the fast Fourier transform coefficient variances. The signal is coupled to a programmable quantizer that feeds representative signals to a multiplexer for transmission over a communications link to the ultimate user.

A prime object of the invention is to provide a data transmission system that reduces the amount of transmitted data.

Another object of the invention is to provide a data transmission system which transmits only the information of interest.

Still another object of the invention is to provide a data transmission system which lends itself to an acoustic data transmission system.

Still another object of the invention is to provide an improvement for time-domain compression systems of significantly reduced complexity to assure greater reliability and cost effectiveness.

Still a further object of the invention is to provide a data transmission system applying adaptive linear filtering to the problem of encoding a noisy source.

Still another object is to provide a data transmission system having a substantial compression ratio with minimum distortion of the critical portions of the transmitted data.

These and other objects, advantages and novel features of the invention will become apparent from the following detailed description of the invention when considered in conjunction with the accompanying drawings.

DESCRIPTION OF THE PREFERRED EMBODIMENT

Figure 2:
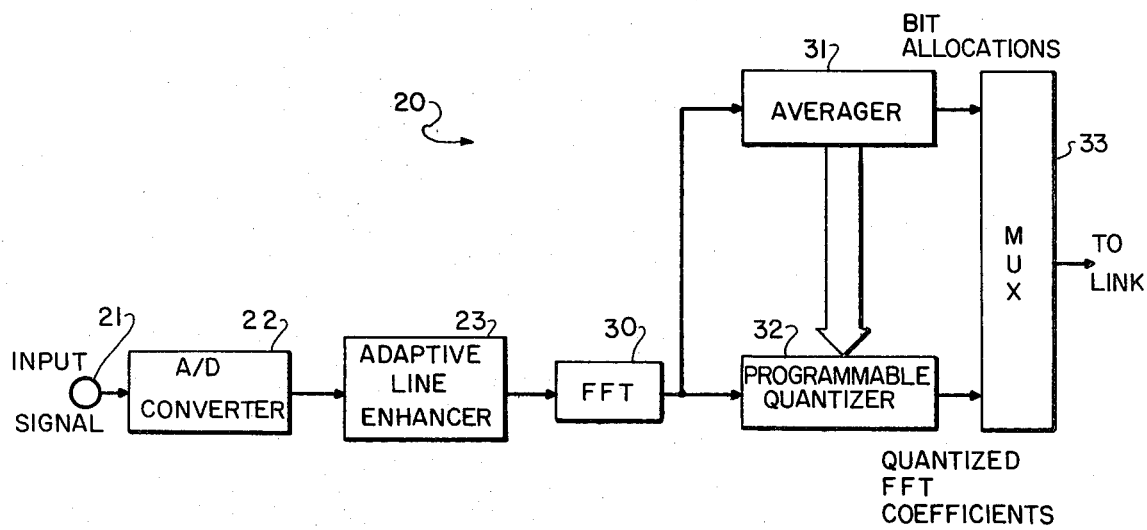
FIG. 2 depicts an adaptive quantizer for acoustic binary information transmission.

Referring now to FIG. 2 of the drawings an adaptive quantizer 20 for acoustic binary information transmission receives analog input signals at an input terminal 21 from, for example, one or more hydrophones or beamformers. These analog signals are converted to digital signals in an A to D converter 22 so that all further processing is digital.

Figure 3:
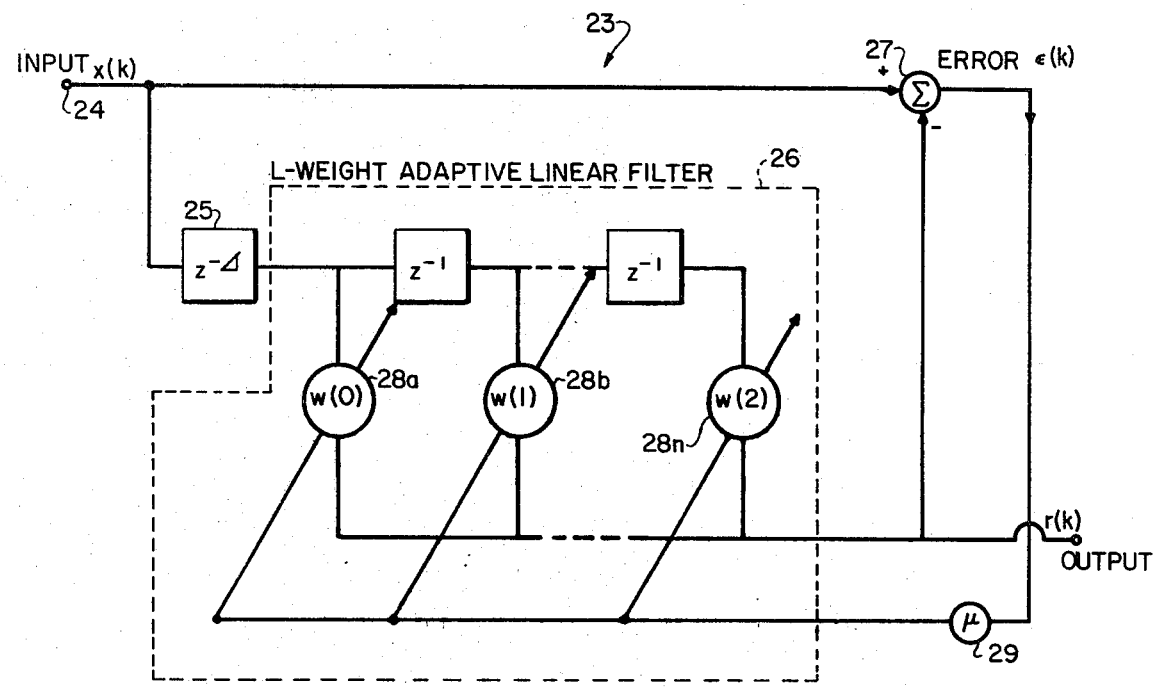
FIG. 3 is a block diagram of the adaptive line enhancer.

The digital signals are passed through an adaptive linear filter or adaptive line enhancer 23 whose reference signal is a delayed version of the inputs. An expanded diagram of the adaptive filter is shown in FIG. 3 and its principles of operation are described in detail by B. Widrow, et al. "Adaptive noise cancelling: principles and applications," Proc. IEEE, vol. 63, pp. 1692-1716, December 1975; and J. R. Zeidler and D. M. Chabries', "An analysis of the LMS adaptive filter used as a spectral line enhancer," Naval Undersea Center Tech. Note TN 1476, February 1975.

Briefly, the adaptive line enhancer works as follows: in the lower channel at input 24, $x(k)$ is delayed in a delay 25 by a fixed amount $\Delta$ prior to being passed through a linear transversal filter 26. The output $r(k)$ of this filter is subtracted in a subtractor 27 from the current input $x(k)$ and the error difference $f(k)$ is fed back to adjust the weights 28a, 28b ... 28n of the $(w_j)(k)$ of the transversal filter according to the Widrow-Hopf algorithm set forth in the Widrow et al article named above. The algorithm states, among other things, that $$w_j(k+1) = w_j(k) + 2\mu\epsilon(k) \times (k-j-\Delta+1) \quad (1)$$

where $\mu$ is a constant which controls the adaption rate. As fully explained in the Widrow et al article, this algorithm adjusts the weights in such a way as to minimize the mean power in $\epsilon(k)$. The delay $\Delta$ is chosen such that any broadband power in the delayed signal $x(k-\Delta)$ is essentially decorrelated with the current input $x(k)$ while any corresponding narrowband power remains highly correlated. Thus, $\Delta$ should lie within the range $\tau_b << \Delta < \tau_n$ where $\tau_b$ and $\tau_n$ are the correlation time constants of the broadband and narrowband input components, respectively.

The implicit strategy of the filter algorithm is to make $r(k)$ a prediction of the current narrowband waveform value in $x(k)$ so that in subtracting $r(k)$ from $x(k)$, the mean power in $\epsilon(k)$ is diminished. Thus, the filter weights tend to form a bandpass transfer function about any narrowband input components and pass relatively little power at other frequencies. An article by J. R. Ziedler et al entitled "Adaptive Enhancement of Multiple Sinusiods in Uncorrelated Noise" details this effect for the case of multiple sinusoids in white noise.

For stationary, uncorrelated input samples it has been shown by Widrow et al that the expected value of $w_j(k)$ in Eq. (1) converges (from an arbitrary initial value) to the solution of the Wiener-Hopf matrix equation $$\Phi W = d \quad (2)$$

where $\Phi$ and $d$ are the $L \times L$ autocorrelation matrix and $L \times 1$ cross-correlation vector, respectively, with elements $$\Phi_{ij} = \phi_{XX}(i-j) \text{ and } d_j = \phi_{xx}(j+\delta-1) \quad (3)$$

provided that $0 < \mu < \lambda_{max}^{-1}$. Here, $\phi_{XX}(m)$ is the autocorrelation function of the input $x(k)$, and $\lambda_{max}$ is the largest eigenvalue of the matrix $\Phi$. The covariance matrix of the weights is shown in Widrow et al to be proportional to $\mu$, and thus can be made arbitrarily small by decreasing $\mu$. Hence, for proper choice of the delay $\Delta$, the adaptive enhancer output approaches the minimum mean-squared error estimate of the current narrowband waveform in the input.

Figure 1:
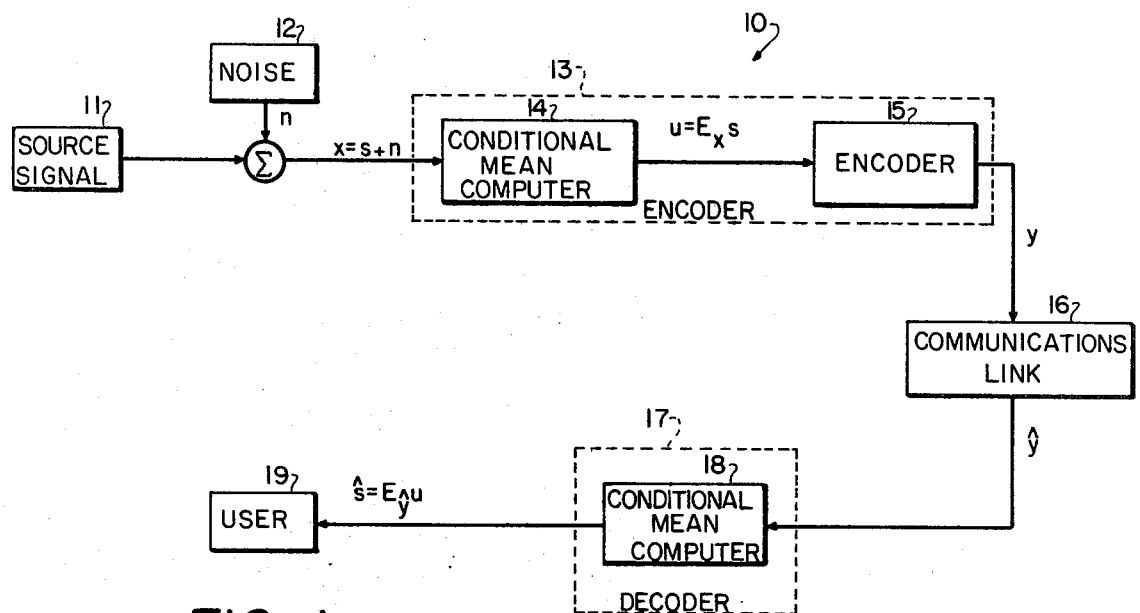
FIG. 1 shows an optimum communications system for transmitting a noisy source signal under the frequency-weighted minimum mean-squared error distortion measure.

For our purposes, the most important features of the adaptive enhancer are that it provides a (suboptimal) approximation to the optimum Wiener filter, requires no knowledge of the input statistics, and is able to adapt to nonstationary inputs. Thus, for Gaussian input signals, it is a practical implementation of the conditional mean computer shown in the encoder block of FIG. 1. The output of the filter will ideally consist of the narrowband source components s against a greatly-reduced background of broadband noise n.

The next step is to encode the filter output for minimum transmission rate. As mentioned previously, this can be accomplished inconvenient and near-optimum fashion by computing fast Fourier transform (FFT) coefficients in FFT computer 30 on blocks of filter output samples. Since the FFT coefficients are approximately uncorrelated for long integration times, this operation removes the statistical redundancy present in the time-domain data. Hence, the distortion introduced by subsequent quantization is uncorrelated (independent for Gaussian data) from one coefficient to another, thereby allowing precise control of the error power spectrum. A fixed-interval average of the squared-magnitudes of the FFT coefficients is periodically computed as an estimate of the variance of each (complex) coefficient. These variance estimates may be weighted in some predetermined fashion to reflect greater or lesser interest in particular frequency regions. The weighted variances $w_k \pi_k^2$ are then used to select the bit allocations for quantizing a number of successive blocks of FFT coefficients for transmission. At the end of a predetermined interval (or when an averager 31 has detected a significant shift in coefficient variances), an updated bit allocation is computed, used to reprogram a reprogrammable quantizer 32, and transmitted over a multiplex link 33. The frequency required for this updating depends, obviously, on the stationarity of the input signal. If the data were stationary, then no updating would be required.

Figure 4:
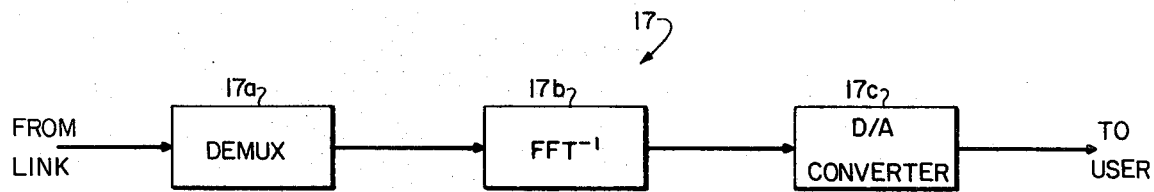
FIG. 4 shows a typical decoder for the acoustic binary information transmission system.

The decoder portion of the system is quite simple, as shown by circuitry 17 in FIG. 4. The demultiplexed FFT coefficients in demux 17a are inverse-transformed in $FFT^{-1}$ 17b to produce time-domain samples, which are fed to a digital-to-analog converter 17c. The analog output of this device is then delivered to the user for signal processing.

Figure 5:
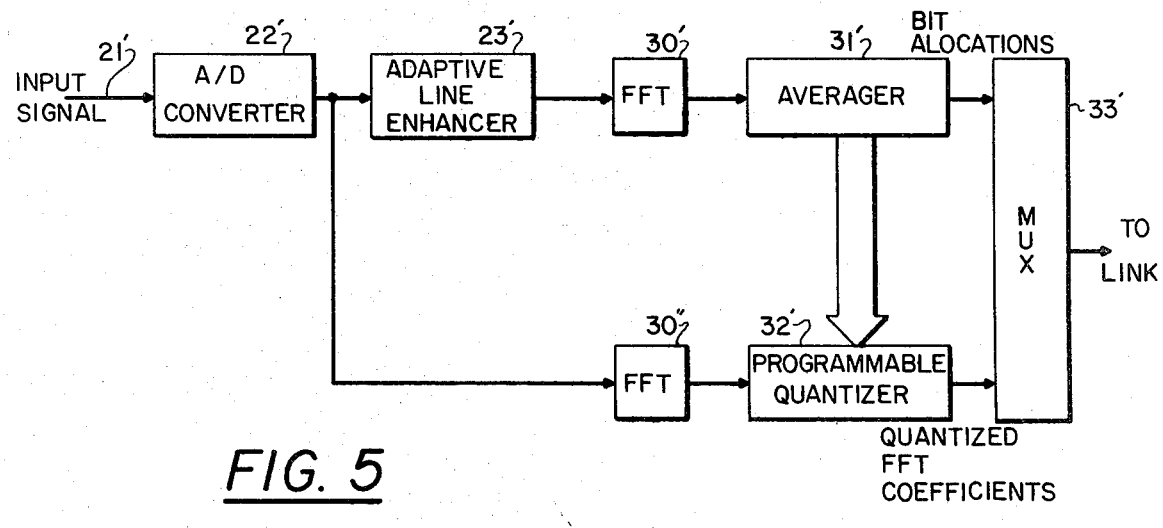
FIG. 5 is an alternative system designed for an acoustic binary information transmission system.

A number of modifications to the system shown in FIG. 2 are possible. FIG. 5, for example, depicts a system wherein the adaptive filter is used only for determining the bit allocation for quantizing FFT coefficients computed on the original data samples, i.e., the filter output is not encoded. The like elements are given the prime superscript to depict like elements to that described above. One advantage of this system is that the transmitted coefficients are corrupted only by quantizing noise, and do not contain any "misadjustment noise" arising from the stochastic nature of the adaptive filter impulse response. Another feature is that the quantization rule can be selected as needed to match a desired distortion measure, i.e., one is not constrained to the structure or strategy imposed by a WMSE encoding rule.

Another possible alternative would be to use a different fast-algorithm orthogonal transform for encoding the data. For example, the discrete cosine transform has been shown to be more efficient than the FFT for decorrelating first-order Markov signals. Other transforms, such as the Walsh-Hadamard, Haar, and Slant transforms require less hardware complexity for their computation. In any case, the overall system designs shown in FIGS. 2-5 remain unchanged—only the transform block would be different.

Obviously many modifications and variations of the present invention are possible in the light of the above teachings. It is therefore to be understood that within the scope of the appended claims the invention may be practiced otherwise than as specifically described.

What is claimed is:

1. An apparatus for reducing the data transmission rate for acoustic signals comprising:
    means providing a source of analog signals representative of acoustic energy;
    means coupled to the analog signal providing means for converting them to digital form;
    means coupled to the converting means for processing the digitized signals in an adaptive line enhancer;
    first means coupled to the adaptive line enhancer processing means for computing the FFT coefficient signals of the input signals;
    means coupled to the FFT computing means for multiplexing the FFT coefficient signals of the input signals;
    means interposed between the FFT computing means and the multiplexing means for averaging FFT coefficient signal variances; and
    means coupled between the FFT computing means and the multiplexing means and to the averaging means for programming an included quantizer.

2. An apparatus according to claim 1 in which the averaging means provides a signal to the quantizer programming means when there has been a FFT coefficient variance beyond a preset magnitude.

3. An apparatus according to claim 2 further including:
    second means coupled to the adaptive line enhancer processing means for computing FFT coefficients thereof and feeding them to the quantizer programming means.

* * * * *